May 19, 1959 G. T. BAKER 2,887,538
TELEPHONE OR LIKE SYSTEMS
Filed March 24, 1955 2 Sheets-Sheet 1
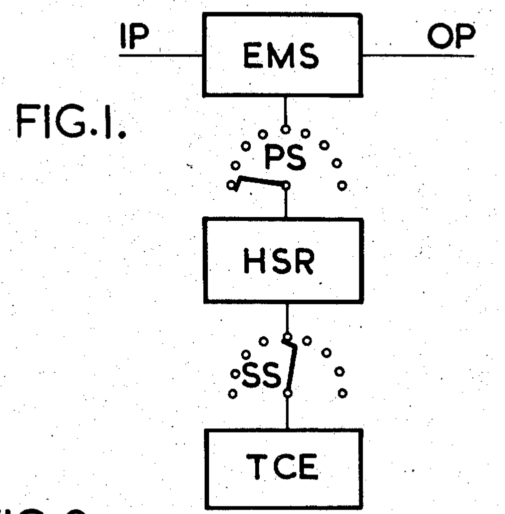
FIG. 2.
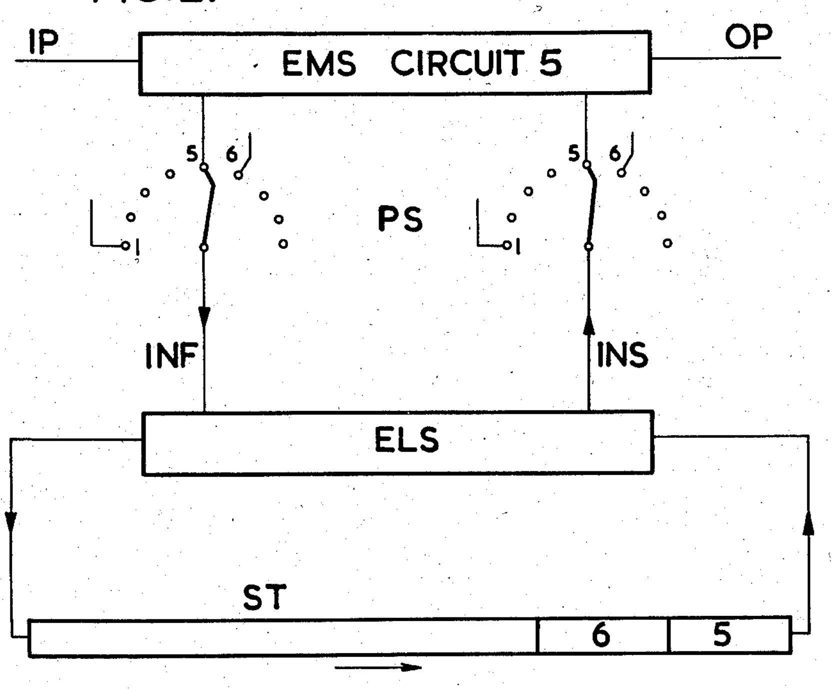
Inventor George Thomas Baker
by [illegible]
Attorney May 19, 1959 G. T. BAKER 2,887,538

TELEPHONE OR LIKE SYSTEMS

Filed March 24, 1955 2 Sheets-Sheet 2

Inventor George Thomas Baker
by Deane Skinner (?)
Attorney

United States Patent Office 2,887,538

Patented May 19, 1959

2,887,538

TELEPHONE OR LIKE SYSTEMS

George Thomas Baker, Taplow, England, assignor to British Telecommunications Research Limited, Taplow, England, a British company Application March 24, 1955, Serial No. 496,577

Claims priority, application Great Britain March 26, 1954

12 Claims. (Cl. 179—18)

Figures 3, 4:
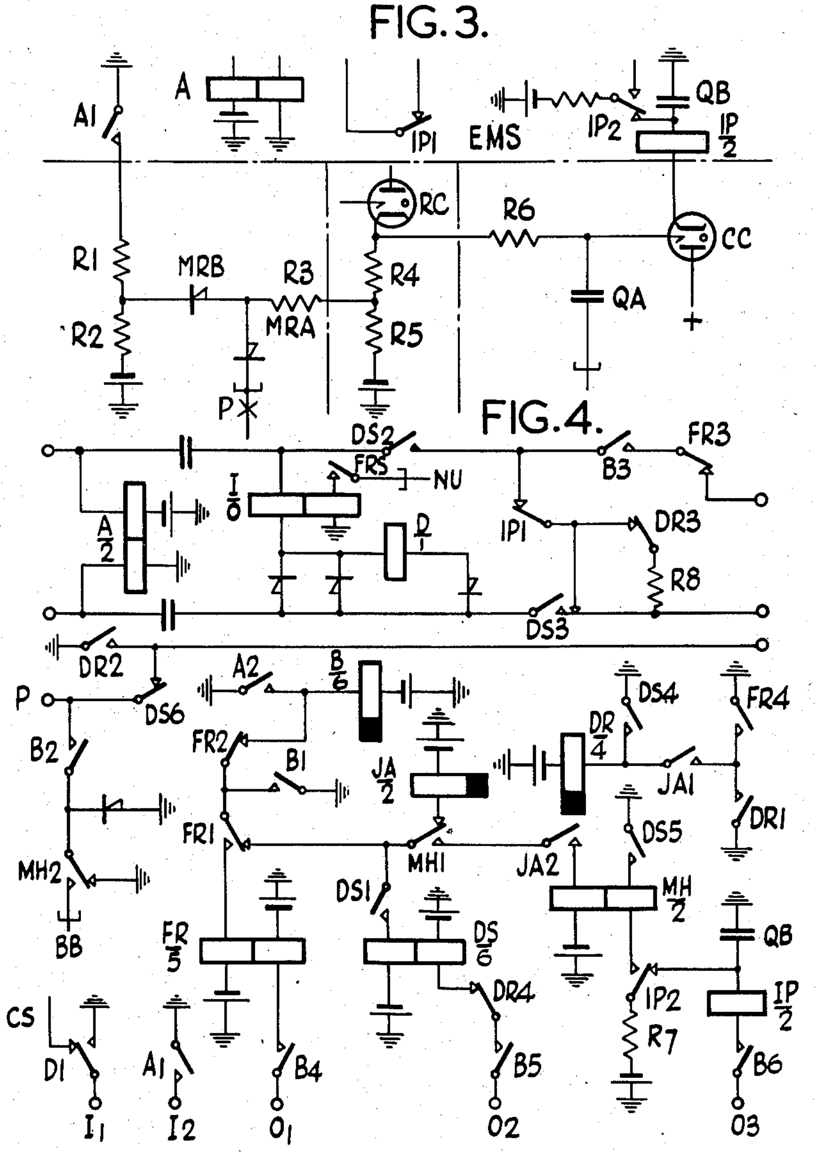

The present invention relates to telephone or like systems and is more particularly concerned with arrangements for effecting the setting up of connections automatically under the control of a high-speed register device, for instance a magnetic drum.

It is now appreciated that it is technically feasible to make use of register devices of this kind for controlling the setting up of telephone connections and various possibilities arise, for instance that the impulses transmitted by a calling subscriber are directly registered on a magnetic drum and subsequently control the transmission of the necessary switching impulses for operating electronic or relay switches in the speaking path. Alternatively in view of the large number of electro-mechanical switches which are at present in existence with a considerable useful life before them, the economics of the situation may require that the magnetic drum should operate merely as a registering and translating device and receive trains of impulses by way of electromagnetic relays and transmit corresponding trains of impulses to operate electromagnetic relays whereby switches of existing type can be set. This though possibly not exploiting all the facilities offered by a magnetic drum is likely to represent a considerable economy compared with the use of step-by-step registers as at present employed.

The present invention is primarily concerned with the efficient use of a magnetic drum in this manner whereby it will serve to replace most or all of the existing electromagnetic register equipment while leaving the switches in the main train unaltered. It will be understood that the expression "magnetic drum" is intended to include an endless tape or disc though the true drum or cylinder is likely to be more convenient in practice.

It is a further object of the invention to improve the arrangements for the control of the magnetic drum and for associating it in turn with the various individual circuits. It will be appreciated that in view of the possibilities of very high-speed storage the drum may conveniently be associated with a plurality of different circuits on a time division basis, this association being effected by so-called scanning apparatus.

It is found in practice that if trains of impulses of the type commonly employed are used for controlling the setting up of connections, the pulse recurrence frequency for the proper reception of incoming impulses must be appreciably greater than the pulse recurrence frequency for the satisfactory transmission of outgoing impulses and with existing conditions the ratio may conveniently be 6:1. Thus if a single track round the circumference of the magnetic drum is able to cater for 20 different connections and the scanning frequency is correspondingly adjusted for the receipt of impulses, then it can be arranged that the equipment for controlling the transmission of impulses can be common to as many as six tracks which are dealt with in succession, that is a total of 120 connections. These different scanning operations will be referred to as primary scanning and secondary scanning.

According to one feature of the invention in a telephone system employing a high-speed register device such as a magnetic drum for the control of electromagnetically-operated mechanical switches, a calling party is arranged to have access to any one of a plurality of relay sets arranged to be repeatedly associated in turn with the register device at intervals less than the time required for the reception of a complete impulse, each relay set responding to dialled impulses to effect a corresponding record on the register device and also responding to signals from the register device to effect the transmission of outgoing impulses for setting automatic switches.

According to another feature of the invention in a telephone system employing a high-speed register device such as a magnetic drum for the control of electromagnetically-operated mechanical switches, a calling party is arranged to have access to any one of a plurality of relay sets which are arranged to be cyclically associated in turn with the register device by a ring of three-electrode gas discharge tubes which is operated to effect the lighting of each tube in turn by impulses transmitted to all the tubes simultaneously in synchronism with the operation of the register device.

According to a further feature of the invention in an automatic telephone system employing a high-speed register device such as a magnetic drum for recording trains of incoming impulses and controlling the transmission of corresponding trains of outgoing impulses for effecting the setting up of connections, by means of a primary scanning operation a common register is arranged to be associated in turn with a plurality of speech paths and by means of a secondary scanning operation common equipment for controlling the transmission of impulses is arranged to be associated in turn with a plurality of such registers, the speeds of the two scanning operations being so related that a register is associated with all the speech paths to which it has access while it remains associated with the equipment for controlling the transmission of impulses.

The invention will be better understood from the following description of one method of carrying it into effect which should be taken in conjunction with the accompanying drawings comprising Figs. 1 to 4. Of these, Fig. 1 indicates the general principle of multiple scanning, two stages as suggested above being shown in this figure. Fig. 2 indicates the relationship between the register, which is assumed to be in the form of a magnetic drum, and the scanning arrangements. Fig. 3 shows certain details of the scanning circuits in conjunction with the relevant portions of an electromagnetic relay set, while Fig. 4 shows the circuit details of one suitable form of this relay set.

Considering first Fig. 1, this is intended to show diagrammatically the principle of multiple scanning. It is assumed that the speech path incoming over IP traverses an electromagnetic relay set EMS to the outgoing side OP whence it is extended over electromechanical switches of known type but that the necessary control is exercised by means of a high-speed register device HSR, preferably in the form of a magnetic drum, which is associated successively with a plurality of speech paths on a time division basis. This is done by means of a primary scanner PS which is diagrammatically illustrated as a uniselector but which in practice, in view of the duty required, would preferably be an electronic switch, for instance of the type shown in greater detail in Fig. 3.

As already suggested, if outgoing impulses at the rate of 10 per second are to be used for setting the automatic switches which establish the connection, the pulse recurrence frequency for the control equipment concerned may be appreciably less than that corresponding to the primary scanner and thus the transmission control equipment TCE can be associated with the various relay sets at a much slower speed. The secondary scanner SS is also diagrammatically shown as a uniselector and it will be understood that with the figures previously mentioned, this will step at a speed ⅙ as fast as the primary scanner and will associate the transmission control equipment TCE with six different drums or six different tracks on the same drum in turn and that while each such association persists the primary scanner will perform a complete cycle.

The principle of multiple scanning can be further extended and a tertiary scanning operation may be employed for instance in connection with meter pulses which as at present employed are of sufficient duration to cover a plurality of setting impulses.

Considering now Fig. 2, this indicates diagrammatically the correlation between the operation of the scanner and the movement or apparent movement of the information through the store which in the circumstances assumed is due to the rotation of the drum. It will be appreciated however that the same conditions apply to the travel of pulses along a mercury delay line or the movement of the beam in a cathode ray tube.

As in the case of Fig. 1, it is assumed that there is an electromagnetic relay set EMS in the speech path between the incoming and outgoing sides IP and OP respectively and this has been referred to as circuit 5. The primary scanner PS is shown as making connection with this circuit and it is assumed that movement of the information through the store ST, i.e. the speed of rotation of the drum, is such that information relating to circuit 5 is just about to become available to transmit to the electronic relay set ELS. This deals with the information obtained from the store and transmits appropriate instructions to the electromagnetic relay set over lead INS. When all the information relating to circuit 5 has become available, the primary scanner will advance to connect with circuit 6 and information relating thereto, which has now advanced to the end of the store, will be similarly dealt with by the electronic relay set and instructions transmitted to the electromagnetic relay set of circuit 6. It will be understood that the incoming information is transmitted from each electromagnetic relay set over what is shown as another wiper of the primary scanner and lead INF to the electronic relay set and thence to the entry to the store.

Considering now the fragmentary circuit details shown in Fig. 3, it will be understood that the equipment shown above the chain-dotted line is assumed to be located in an electromagnetic relay set similar to that shown in full in Fig. 4. The equipment below the dotted line represents a portion of the primary scanner and suitable arrangements are shown for controlling the input and output sides of the relay set. The timing member or time base is assumed to be a cold cathode cyclic counter of known type and the element RC of this ring individual to the particular electromagnetic relay set is shown in Fig. 3. The arrangement is such that in response to time pulses transmitted to all the tubes of the ring simultaneously the individual tubes strike in turn at a speed in accordance with the requirements of the circuit each tube extinguishing the tube immediately preceding it in the cycle so that only one tube is lighted at a time. The cathode load of tube RC represented by resistors R4 and R5 is tapped at their junction point to provide a signal, which may be of 10 volts amplitude, which controls the input switch and the cathode of the tube provides a signal, which may be of 60 volts amplitude, which controls the output switch. The other input and output switches are similarly controlled by their associated tubes. The transmission of both input and output signals occupies only a small part of each circuit time and the distorted shape of the cathode pulse is immaterial as long as the particular portion used is towards the end of each pulse where the current has had time to settle to a steady value.

Considering now the left-hand side of Fig. 3, the cyclically recurring 10 volt pulse is extended by way of resistor R3 and rectifier MRA to the common point P unless short-circuited by the control rectifier MRB. As shown the information to be signalled consists of the state of contact A1, i.e. whether the subscriber's loop is open or closed. If contact A1 is closed, the potential divider formed by resistors R1 and R2 ensures that the point is raised about 10 volts above the negative potential. In this case there is no shunting action due to rectifier MRB and the pulse produced by the striking of the tube RC of the counter is extended to point P. If however, the contact A1 is open, the junction point of resistors R1 and R2 is at full negative potential so that the rectifier MRB is conducting and the comparatively low resistance R2 shunts the pulse from the tube. The point P is connected to the electronic relay set ELS by way of a valve amplifier indicated by the cross and the cathode bias of this valve is such that the valve is cut off unless the point P is moved positive by the time pulse. The signal to the electronic relay set is taken from the anode of the valve amplifier which is connected to earth potential via a low resistance. Accordingly if contact A1 is closed, a 10-volt negative signal relative to earth is passed to the electronic equipment. If the contact is open, and hence the valve is non-conducting, an earth potential signal is given.

The output switch shown on the right-hand side of Fig. 3 comprises a cold cathode triode CC with its striker electrode primed through a high value resistor R6 from the 60-volt time pulse. The output from the electronic relay set is applied via capacitors such as QA to all the tubes in the group but only that tube which is primed at the instant of the pulse application will fire. The relay IP in the electromagnetic relay set is connected in the cathode circuit of the tube and the circuit is so arranged that the operation of the relay quenches the tube and the relay may be locked up independently if the circuit requirements make this desirable. If the relay is to remain operated for a predetermined period, a capacitor can be employed to give a slow release characteristic, for instance the capacitor QB shown.

It will be appreciated that other forms of circuit may be used for effecting connection with the individual relay set or other circuit element. In every case however the necessary time pulse will be required and this is preferably obtained from a separate pulse track on the drum. The various time pulses required may conveniently be obtained from a series of electronic toggle circuits which are changed over in turn and are then reset in turn under the control of a strobe pulse derived from the pulse track. The outputs of the different toggle circuits may then be combined as required to give both successive pulses of the same unit length and grouped pulses of length equal to a plurality of units. Thus where a group of six pulses is required, these may conveniently be obtained from a series of three toggle circuits. In addition to the operating strobe pulse, there may also be a synchronising pulse provided from the drum, at the beginning of each pulse cycle so as to ensure against possible loss of synchronism.

Considering now the details of the electromagnetic relay set shown in Fig. 4, it will be understood that the information to be signalled to the electronic equipment may be summarised as the actions of the calling subscriber as represented by the state of relay A, the actions of the called subscriber as represented by the state of relay D, and also the status of the calling subscriber, i.e. whether he is debarred from establishing certain calls. This latter information is normally available early in the setting up of the connection, that is to say before the called subscriber comes in question and may therefore be conveniently transmitted over a back contact of relay D so that two leads suffice.

The control exerted by the electronic equipment may be split up into four functions (1) the transmission of impulses to set up the train of switches to complete the connection; (2) the control of the transmission bridge, that is to say changeover from the low impedance impulsing circuit to the high impedance speech path; (3) the operation of the calling subscriber's meter dependent on the value of the call which has been set up and possibly also on its duration, and (4) the release of the connection, normally when the calling party hangs up. The transmission of metering pulses can conveniently be done over the same lead as is used for controlling the transmission of setting impulses so that three leads are required for transmitting instructions out from the electronic equipment.

Considering now the actual circuit details, when the relay set is taken into use, relay A operates, and at contacts A1 completes a circuit extending to the electronic relay set by way of terminal I2 and at contacts A2 energises relays B and JA. Relay B at contacts B1 completes a locking circuit for itself, at contacts B2 applies the usual holding earth to the P conductor, at contacts B3 closes a point in the outgoing loop to the succeeding automatic switch and at contacts B4, B5 and B6 prepares the instruction circuits extending from the electronic relay set by way of terminals O1, O2 and O3. Relay JA at contacts JA1 prepares a locking circuit for relay DR and at contacts JA2 prepares a circuit for relay MH. It will be noted that if the calling party is restricted as to the class of call he is allowed to make, potential applied to lead CS is extended over contacts D1 and terminal I1 to control the operation of the electronic relay set accordingly.

When the subscriber subsequently transmits impulses for setting up the connection, relay A responds and the impulses are repeated at contacts A1 by way of terminal I2 into the electronic relay set and are registered on the magnetic drum. At a suitable point of time, for instance after the three letters of the exchange name have been registered, the control equipment for the magnetic drum initiates translation and commences transmitting the routing digits in the form of short pulses to terminal O3 each pulse representing the commencement of an impulse to be transmitted over the speech path. Since these impulses are already divided up into suitable trains by the drum control equipment, they may be considered individually. Relay IP operates in response to each impulse and thereupon at contacts IP1 opens the outgoing loop to effect the setting of the various automatic switches in the speech path and at contacts IP2 opens its own circuit and prepares a circuit for relay MH which is not effective at this stage. The provision of the capacitor QB which is normally charged through resistor R7 ensures that relay IP remains energised for a predetermined time which is arranged to give the required duration of interruption of the outgoing circuit.

When sufficient impulses have been transmitted to effect the complete setting up of the connection, earth is applied in the electronic relay set to terminal O2 to effect the operation of relay DS. This thereupon at contacts DS1 locks up over its left-hand winding, at contacts DS2 and DS3 switches the speaking leads through thereby including relays I and D in circuit though still shunted by resistor R8, at contacts DS4 energises relay DR, at contacts DS5 prepares a circuit for relay MH and at contacts DS6 removes earth from the outgoing P conductor. Relay DR at contacts DR1 locks up dependent upon relay JA, at contacts DR2 reapplies earth to the outgoing P conductor, at contacts DR3 removes resistor R8 from in shunt of relays I and D and at contacts DR4 opens the initial circuit for relay DS.

When the called party replies, relay D operates in response to the usual reversal of current over the line, and at contacts D1 applies earth to terminal I1 connected to the electronic relay set. Responsive to this earth the appropriate number of meter pulses are applied to terminal O3 and each causes the operation of relay IP. Contacts IP1 are now ineffective but contacts IP2 operate relay MH which at contacts MH1 releases relay JA and completes a temporary locking circuit for itself over its left-hand winding and at contacts MH2 applies booster battery over lead BB to the P lead. On the release of relay IP and shortly thereafter of relay JA, relay MH is released, the meter impulse is terminated and relay JA is again operated. This operation takes place for each impulse and may be repeated subsequently if time metering is provided.

When the connection is terminated as represented by the calling party hanging up, relay A transmits a signal to the electronic relay set over terminal I2 and thereupon earth is applied to terminal O1 to operate relay FR. This thereupon at contracts FR1 completes a locking circuit for itself by way of its left-hand winding and releases relays DS and JA, at contacts FR2 opens the circuit of relay B, at contacts FR3 opens the outgoing loop, at contacts FR4 completes a temporary holding circuit for relay DR and at contacts FR5 connects up NU tone from lead NU to relay I. The operated switches are accordingly released and the electromagnetic relay set is made available for use in setting up a further connection.

The provision of NU tone obviously serves no purpose in the circumstances just described since the calling subscriber has already hung up. It is arranged however that the electronic relay set will connect earth to terminal O1 in case the subscriber delays to dial or dials a false exchange code and in this case NU tone is transmitted to the calling subscriber to advise him of his error. The relay set is held until the calling party hangs up since contacts A2 maintain relay B.

I claim:

1. In a telephone system, a plurality of groups of speech circuits over which trains of incoming impulses may be transmitted, a like plurality of high-speed register devices of the closed circulating type, primary scanning means for repeatedly associating each speech circuit of a group in turn with the corresponding one of said register devices to permit the registration of said incoming impulses thereon, equipment for controlling the transmission of outgoing impulses, secondary scanning means for repeatedly associating said register devices in turn with said equipment to permit outgoing impulses to be transmitted in accordance with the incoming impulses registered on said register devices respectively, and means for maintaining the speed of operation of said second scanning means as a predetermined sub-multiple of the speed of operation of said first scanning means.

2. In a telephone system according to claim 1, the provision of tertiary scanning means for associating common metering control equipment in turn with a plurality of impulse transmission control equipments at intervals which are multiples of those at which the impulse transmission control equipments are respectively associated with register devices.

3. In a telephone system, a plurality of groups of speech circuits over which trains of incoming impulses may be transmitted, a like plurality of high-speed register devices of the magnetic drum type provided with a like plurality of circumferential tracks, primary scanning means for repeatedly associating each speech circuit of a group in turn with the corresponding track to permit the registration of said incoming impulses thereon, equipment for controlling the transmission of outgoing impulses, secondary scanning means for repeatedly associating said tracks in turn with said equipment to permit outgoing impulses to be transmitted in accordance with the incoming impulses registered on said tracks respectively, and means for maintaining the speed of operation of said second scanning means as a predetermined sub-multiple of the speed of operation of said first scanning means whereby the whole of any track is scanned by said primary scanning means before said second scanning means operates to associate said impulse transmission control equipment with a different track.

4. In a telephone system having connections set up over automatic switches in response to trains of impulses dialled by a calling party, a plurality of groups of relay sets individually associated with calling lines, a like plurality of high-speed register devices of the closed circulating type, primary scanning means for repeatedly associating each relay set of a group in turn with the corresponding one of said register devices to permit the registration of said incoming impulses thereon, equipment for controlling the transmission of outgoing impulses, secondary scanning means for repeatedly associating said register devices in turn with said equipment to permit outgoing impulses to be transmitted from said relay sets respectively in accordance with the incoming impulses registered on the corresponding register devices and means for maintaining the speed of operation of said second scanning means as a predetermined sub-multiple of the speed of operation of said first scanning means.

5. In a telephone system, a plurality of relay sets individually associated with calling lines over which trains of incoming impulses may be transmitted, a high-speed register device of the magnetic drum type provided with a plurality of circumferential tracks each providing storage space for a plurality of relay sets for the information represented by said incoming impulses, means for repeatedly associating said relay sets respectively with said individual storage spaces, control equipment common to all said tracks and means for associating said control equipment with said tracks in turn at a repetition frequency which is a sub-multiple of the frequency of association of said relay sets with the individual storage spaces on said drum.

6. In a telephone system having connections set up over automatic switches in response to trains of impulses dialled by a calling party, a plurality of relay sets individually associated with calling lines over which trains of incoming impulses may be transmitted, a high-speed register device of the closed circulating type, a ring of three-electrode gas discharge tubes equal in number to the number of relay sets, means for transmitting impulses to all said tubes simultaneously to effect the lighting of each tube in turn, and means associated with the cathode of each tube whereby signals from the associated relay set representing incoming impulses are rendered effective to operate the register device when the corresponding tube is alight.

7. In a telephone system having connections set up over automatic switches in response to trains of impulses dialled by a calling party, a plurality of relay sets individually associated with calling lines over which trains of incoming impulses may be transmitted, a high-speed register device of the closed circulating type, a ring of three-electrode gas discharge tubes equal in number to the number of relay sets, means for transmitting impulses to all said tubes simultaneously to effect the lighting of each tube in turn, biassing means associated with the cathode of each tube whereby signals from the associated relay set representing incoming impulses are rendered effective to operate the register device when the corresponding tube is alight, and means in the register device whereby signals representing outgoing impulses are transmitted back to the relay set for which the corresponding tube is alight.

8. In a telephone system having connections set up over automatic switches in response to trains of impulses dialled by a calling party, a plurality of relay sets individually associated with calling lines over which trains of incoming impulses may be transmitted, a high-speed register device of the closed circulating type, a ring of three-electrode gas discharge tubes equal in number to the number of relay sets, means for transmitting impulses to all said tubes simultaneously to effect the lighting of each tube in turn biassing means associated with the cathode of each tube whereby signals from the associated relay set representing incoming impulses are rendered effective to operate the register device when the corresponding tube is alight, and pulse-generating means in the register device co-operating with said biassing means and operating at a frequency which is a sub-multiple of the frequency of operation of each of said tubes.

9. In a telephone system according to claim 8, the provision of a further three electrode gas discharge tube individually associated with each relay set and having in its cathode circuit an impulse responding relay in the relay set and having its trigger electrode subject to the said biassing means and also to pulses from said pulse generating means.

10. In a telephone system having connections set up from calling lines over automatic switches in response to series of regular interruptions in the current flow over said lines, a plurality of relay sets individually associated with said calling lines, a high-speed register device of the closed circulating type and means for repeatedly associating said relay sets with said register device in turn at intervals less than the duration of one of said interruptions, each of said relay sets including first means for responding to interruptions of the current flow over the associated calling line, means operated by said first responding means for transmitting a signal to said register device in response to each such interruption, second means for responding to a signal from said register device and means operated by said second responding means for controlling the transmission of an outgoing impulse from said relay set.

11. In a telephone system according to claim 10, the provision of means in said relay set for transmitting a signal to the register device on the reply of the called party to initiate the transmission of metering pulses.

12. In a telephone system as claimed in claim 10, the provision of means in each relay set responsive to a signal from the register device on the completion of dialling, said means serving to condition the relay set for speaking and to alter the circuits controlled by said second responding means whereby further signals transmitted from the register device similar to those corresponding to outgoing impulses effect a metering rather than a switch-setting operation.

References Cited in the file of this patent

UNITED STATES PATENTS

| | | |
|---|---|---|
| 2,298,519 | Tillman | Oct. 13, 1942 |
| 2,675,427 | Newby | Apr. 13, 1954 |
| 2,680,155 | Molnar | June 1, 1954 |